Aug. 9, 1938.　　　H. H. HARMON ET AL　　　2,126,324
ROLL HOLDING CAMERA
Filed Oct. 13, 1937
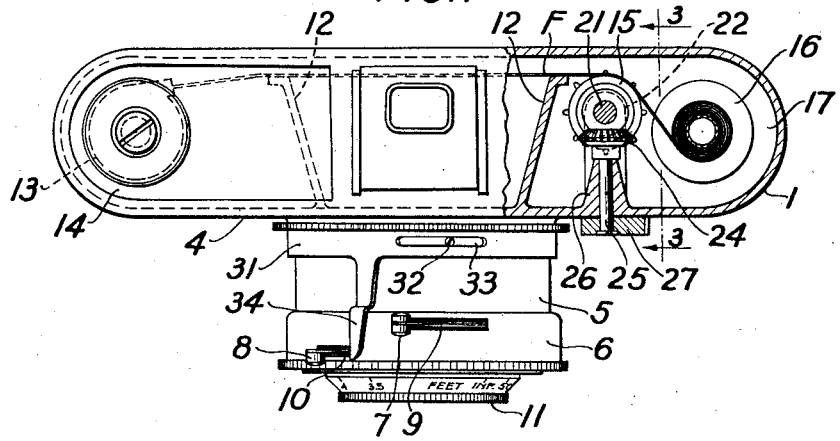
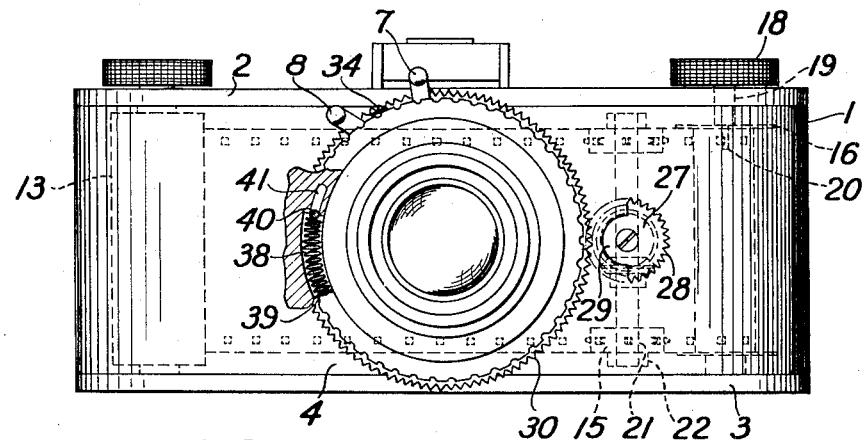
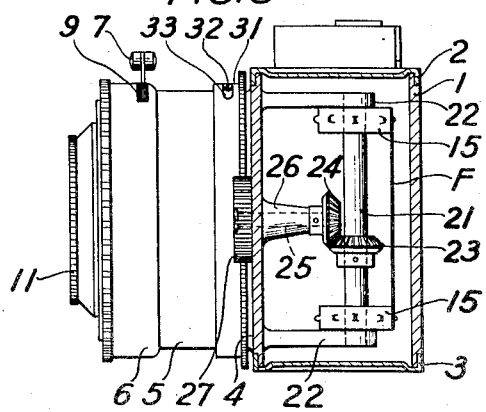
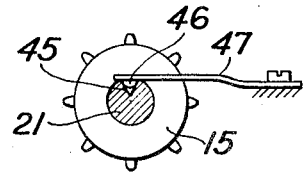
Herbert H. Harmon
Newton B. Green
INVENTORS
BY
ATTORNEYS Patented Aug. 9, 1938

2,126,324

UNITED STATES PATENT OFFICE 2,126,324

ROLL HOLDING CAMERA

Herbert H. Harmon and Newton B. Green, Rochester, N. Y., assignors to Eastman Kodak Company, Rochester, N. Y., a corporation of New Jersey Application October 13, 1937, Serial No. 168,774

9 Claims. (Cl. 95—31)

This invention relates to photography, and more particularly to roll film cameras.

One object of our invention is to provide a simple type of camera adapted to use perforated film, such as the standard 35 mm. perforated motion picture film. Such film is commonly sold in retorts and on spools containing different numbers of exposures—usually eighteen or thirty-six. Another object of our invention is to provide a camera with a mechanism which will reduce the liability of incorrect operation of the camera. Another object of our invention is to provide a camera with a mechanism which will reduce the liability of incorrect operation of the camera. Another object of our invention is to provide a camera with a mechanism by which the film may be wound by turning a suitable winding member and the film will transmit motion to a device for setting the camera shutter. Another object of our invention is to provide a camera with a mutilated gearing so arranged that one revolution of the mutilated gear will take place during the winding movement of the film and during a portion of this revolution, the mutilated gear will turn a shutter gear to set the shutter. Other objects will appear from the following specification, the novel features being particularly pointed out in the claims at the end thereof.

Coming now to the drawing in which like reference characters denote like parts throughout:

Fig. 1 is a top plan view, partially broken away, showing a typical camera constructed in accordance with a preferred embodiment of our invention.

Fig. 2 is a front elevation of the camera shown in Fig. 1 also broken away in part to show the construction of a part of the camera.

Fig. 3 is a section taken on line 3—3 of Fig. 1.

Fig. 4 is a fragmentary detail of a modified form of winding mechanism latch.

In order to provide a relatively inexpensive camera which greatly reduces the liability of improperly using the camera, we have provided a camera of the roll film type with a setting shutter in which the winding of the film sets the shutter, and in which the shutter cannot be easily actuated unless the film has first been wound.

In the preferred form of our invention shown in the drawing, the camera may consist of a body portion 1 which may be made from a suitable molded composition, the open ends of which are covered by suitable caps 2 and 3 which can be conveniently made of metal. The front wall 4 of the camera may support a tubular extension 5, on the end of which a shutter 6 may be mounted. This shutter is preferably of the well-known setting type and includes a setting lever 7 and a trigger 8 extending out through the slots 9 and 10 in the shutter casing. In the present instance, the shutter may be equipped with an objective of the focusing type, there being a movable front cell 11 which may be turned to focus different objects on a film F which passes across a suitable exposure frame, the end walls of which are shown in Fig. 1 at 12. The film F may be wound from a retort 13 or from a film spool from a film spool chamber 14 across the exposure frame 12, over a sprocket 15 and onto a spool 16 in the spool chamber 17. In order to wind film onto the take-up spool 16, a standard form of winding knob 18 may be provided on a shaft 19 having a winding key 20 entering a slot in the spool 16. Thus, when the knob 18 is turned, film is wound over the sprocket 15. This sprocket is carried by a shaft 21 rotatably mounted on a pair of brackets 22 which may be carried by the front camera wall 4. Also affixed to shaft 21 is a bevel gear 23, best shown in Fig. 3, this bevel gear meshing with a similar bevel gear 24 carried by a stub shaft 25 supported in a bearing 26, also carried by the front wall 4 of the camera.

On the end of the shaft 25, there is a mutilated gear 27 having a number of teeth 28 extending around a portion of its periphery—here shown as approximately 180°—and having a portion of the gear cut away, as indicated at 29. The teeth 28 of the gear 27 are adapted to mesh with the teeth 30 on the annular member 31 which is carried upon the tubular member 5, this ring being guided on the tube 5 by means of the pin 32 and slot 33. Usually three sets of pins and slots are provided, so that the annular member 31 is permitted to move in two directions upon the tube.

When moved in one direction, an arm 34 may engage the trigger member 8 to operate the shutter in a manner fully described in the copending application of Herbert H. Harmon, Serial No. 153,997, filed July 16, 1937. When the annular member 31 is moved in a reverse direction, the arm strikes and moves the setting lever 7 to place the shutter spring under tension. If desired, the shutter setting lever 7 may be cut off so that while it may be engaged by the arm 34, it is too short to be conveniently operated by an operator. The reason for this is that it is desirable to have the shutter setting member operated solely by winding the film.

As the knob 18 is turned and the film moves, the annular member 31, through the bevel gears 23 and 24 and through the mutilated gear 27, is moved in a clock-wise direction, thus setting the shutter. The dimensions of the sprocket 25 are such that the mutilated gear 27 is turned one revolution each time a fresh area of film is wound into place.

After an exposure has been made, the camera parts are in the position shown in Fig. 2. By winding the winding knob 18, the mutilated gear turns until the teeth 28 mesh with the teeth 30, turning the annular member 31 in a clockwise direction, thus setting the shutter, and then continued movement of the mutilated gear positions the teeth again as shown in Fig. 2, with the cutout portion of the gear 29 opposite the teeth 30. By reversing the movement of the annular member 31, utilizing the teeth 30 on the annular member as a shutter actuator, the arm 34 moves in a counterclockwise direction to engage and trip the shutter making an exposure.

Should the operator again depress the trigger 8 or operate it through the annular member 31 as above described, an exposure, of course, would not take place because the shutter had not been set. By winding the film by the knob 18, the shutter will again be placed in condition for exposure, thus double exposures are prevented.

Since it is desirable to hold the annular member 31 in a normal position, we prefer to provide a spring 38, one end of which rests against a shoulder 39 and the other end of which rests against a pin 40 which may also move in the slot 41. After an exposure has been made by depressing the trigger 8 through the arm 34, the annular member 31 is returned to the position shown in Fig. 1 by the spring 38. From this position, the annular member may be turned still further in a clockwise direction through the operation of the mutilated gear 27.

It is sometimes desirable to provide an arrangement so that an operator, in turning the knob 18, can feel when an exposure area is wound into place. This can easily be accomplished as indicated in Fig. 4 by adding to the sprocket shaft 21, a notch 45 which may be engaged by a rounded knob or protuberance 46 carried by a spring arm 47 permanently attached to the camera body. Thus, at every revolution of the sprocket 15, the knob 46 drops into the notch 45 and tends to stop the winding movement. It is, therefore, unnecessary for the operator to carefully watch the winding movement.

As will be seen from the above description, this camera is comparatively simple in construction and can be made relatively inexpensively and at the same time the camera insures proper operation by preventing double exposures. It will probably be desirable to cover the connection between the mutilated gear 27 and the annular member 31 with a decorative housing or cover, but this has been omitted from the present showing to better show the construction of the camera parts.

We claim:

1. In a photographic camera the combination with a camera body, including supply and take-up film chambers adapted to receive apertured film and with an exposure frame therebetween, of a manually operable member carried by the camera and extending into the take-up spool chamber for winding film therein, a sprocket mounted in the camera adapted to engage and be moved by the apertured film, a shutter carried by the camera, a setting member carried by the shutter and operable connections between the sprocket and shutter setting member for moving the latter from the former whereby film being manually wound into the take-up film spool chamber may turn said sprocket and set said camera shutter.

2. In a photographic camera the combination with a camera body, including supply and take-up film chambers adapted to receive apertured film and with an exposure frame therebetween, of a manually operable member carried by the camera and extending into the take-up spool chamber for winding film therein, a sprocket mounted in the camera adapted to engage and be moved by the apertured film, a shutter carried by the camera, a setting member carried by the shutter and operable connections between the sprocket and shutter setting member for moving the latter from the former and comprising a gear carried by the sprocket, a shaft extending through the camera body having two gears, one meshing with the sprocket gear, a movable member carrying teeth mounted on the shutter for setting the shutter, the other of said gears being adapted to mesh with the gear teeth of the member carried by the shutter whereby the latter may be moved by film passing over the sprocket to set the shutter by manually winding the film.

3. In a photographic camera, the combination with a camera body including film spool chambers with an exposure frame therebetween, of a manually operable film wind, a film sprocket over which film passes in moving from one spool chamber to the other, a shutter carrying an objective mounted on the camera, a shutter controlling ring mounted to turn axially with respect to the objective, a gear segment carried by the ring, a mutilated gear adapted to mesh with the gear segment, a rotatable shaft carrying said mutilated gear and gearing between said shaft and film sprocket whereby said ring may be turned by said sprocket.

4. In a photographic camera, the combination with a camera body including film spool chambers with an exposure frame therebetween, of a manually operable film wind, a film sprocket over which film passes in moving from one spool chamber to the other, a shutter carrying an objective mounted on the camera, a shutter tensioning member carried by the shutter, a shutter controlling ring mounted to move on the shutter casing and positioned to tension the shutter through contact with the shutter tensioning lever when moved in one direction, gear teeth carried by said ring, a mutilated gear carried by the camera and adapted to turn and mesh with said gear teeth to move the ring a predetermined distance necessary to set the shutter, and means connecting the mutilated gear to the sprocket for moving the former from the latter as film is moved over the sprocket.

5. In a photographic camera, the combination with a camera body including film spool chambers with an exposure frame therebetween, of a manually operable film wind, a film sprocket over which film passes in moving from one spool chamber to the other, a shutter carrying an objective mounted on the camera, a shutter tensioning member carried by the shutter, a shutter controlling ring mounted to move on the shutter casing and positioned to tension the shutter through contact with the shutter tensioning lever when moved in one direction, gear teeth carried by said ring, a mutilated gear carried by the camera and adapted to turn and mesh with said gear teeth to move the ring a predetermined distance necessary to set the shutter, and means connecting the mutilated gear to the sprocket for moving the former from the latter as film is moved over the sprocket, said mutilated gear including a predetermined number of teeth adapted at each revolution to engage and move the gear teeth of the ring, the mutilated portion of the gear permitting the ring to move separately from the mutilated gear when the gear teeth are not engaged.

6. In a photographic camera, the combination with a camera body including film spool chambers with an exposure frame therebetween, of a manually operable film wind, a film sprocket over which film passes in moving from one spool chamber to the other, a shutter carrying an objective mounted on the camera, a shutter tensioning member carried by the shutter, a shutter controlling ring mounted to move on the shutter casing and positioned to tension the shutter through contact with the shutter tensioning lever when moved in one direction, gear teeth carried by said ring, a mutilated gear carried by the camera and adapted to turn and mesh with said gear teeth to move the ring a predetermined distance necessary to set the shutter, and means connecting the mutilated gear to the sprocket for moving the former from the latter as film is moved over the sprocket, said mutilated gear including a predetermined number of teeth adapted at each revolution to engage and move the gear teeth of the ring, the mutilated gear being so positioned that the teeth are normally out of engagement with the teeth of the ring, but when turned one revolution by the sprocket may engage said teeth and move said ring, releasing said teeth after a predetermined rotation whereby said ring may be moved independently of said mutilated gear.

7. In a photographic camera, the combination with a camera body including film spool chambers with an exposure frame therebetween, of a manually operable film winding device for moving film from one spool chamber to the other, a shutter of the setting type carried by the camera, a film sprocket mounted adjacent the exposure frame, said sprocket diameter being such that one revolution thereof measures one exposure area of apertured film, a beveled gear carried by the sprocket, a shaft carrying a beveled gear meshing with the sprocket gear, a ring gear carried by the shutter, and a gear carried by the shaft, at least one of the two last mentioned gears having a recess with teeth cut from the gear, the two gears being normally in a position in which the teeth do not mesh, the teeth of the gears being meshed and unmeshed by turning the manually operable film winding device a distance sufficient to wind one exposure area of film into place, and means carried by the ring gear for setting the shutter as the same is turned by the sprocket.

8. In a photographic camera, the combination with a camera body including film spool chambers with an exposure frame therebetween, of a manually operable film winding device for moving film from one spool chamber to the other, a shutter of the setting type carried by the camera, a film sprocket mounted adjacent the exposure frame, said sprocket diameter being such that one revolution thereof measures one exposure area of apertured film, a beveled gear carried by the sprocket, a shaft carrying a beveled gear meshing with the sprocket gear, a ring gear carried by the shutter and a gear carried by the shaft, said gear being mutilated, means for normally holding the gear and sprocket in a set position with the mutilated gear portion adjacent the ring gear, a spring for holding the ring gear in a predetermined position, said manually operable film winding device being adapted to turn said mutilated gear into mesh with said ring gear moving the latter as film is wound until its normal position is reached whereby said ring gear may be spring operated to its normal position, and connections between the ring gear and shutter for setting the latter as the former is moved during the film winding movement.

9. In a photographic camera, the combination with a camera body including film spool chambers with an exposure frame therebetween, of a manually operable film winding device for moving film from one spool chamber to the other, a shutter of the setting type carried by the camera, a film sprocket mounted adjacent the exposure frame, said sprocket diameter being such that one revolution thereof measures one exposure area of apertured film, a beveled gear carried by the sprocket, a shaft carrying a beveled gear meshing with the sprocket gear, a ring gear carried by the shutter and a gear carried by the shaft, said gear being mutilated, means for normally holding the gear and sprocket in a set position, comprising a manually releasable latch member, with the mutilated gear portion adjacent the ring gear, a spring for holding the ring gear in a predetermined position, said manually operable film winding device being adapted to turn said mutilated gear into mesh with said ring gear moving the latter as film is wound until its normal position is reached and said sprocket is again latched, whereby said ring gear may be spring operated to its normal position, and connections between the ring gear and shutter for setting the latter as the former is moved during the film winding movement.

HERBERT H. HARMON.
NEWTON B. GREEN.